(12) United States Patent
Fairstein

(10) Patent No.: US 8,474,445 B2
(45) Date of Patent: Jul. 2, 2013

(54) CONCENTRATING SOLAR ENERGY DEVICE

(76) Inventor: Joel Fairstein, Knoxville, TN (US)

( * ) Notice: Subject to any disclaimer, the term of this patent is extended or adjusted under 35 U.S.C. 154(b) by 80 days.

(21) Appl. No.: 13/225,410

(22) Filed: Sep. 3, 2011

(65) Prior Publication Data

US 2013/0055999 A1  Mar. 7, 2013

(51) Int. Cl.
*F24J 2/10* (2006.01)

(52) U.S. Cl.
USPC ........... 126/600; 126/623; 126/634; 126/685; 126/686

(58) Field of Classification Search
USPC .............. 126/600, 573, 623, 634, 683, 684, 126/686, 696, 698, 693, 685; 72/379.2
See application file for complete search history.

(56) References Cited

U.S. PATENT DOCUMENTS

| 3,868,823 | A | 3/1975 | Russell, Jr. et al. |
| 4,004,574 | A | 1/1977 | Barr |
| 4,286,580 | A | 9/1981 | Sitnam |
| 4,439,020 | A * | 3/1984 | Maruko ........................ 359/729 |
| 4,587,951 | A | 5/1986 | Townsend et al. |
| 4,602,613 | A | 7/1986 | Barr |
| 6,485,152 | B2 * | 11/2002 | Wood ............................ 359/853 |
| 7,412,976 | B2 | 8/2008 | Winston |

* cited by examiner

*Primary Examiner* — Alfred Basichas

(57) ABSTRACT

A concentrating solar energy device for use in buildings is configured to share structural elements with a building for cost savings. The device incorporates a shallow cylindrical trough mirror comprising mirrored sheets that are conformed to curved rafters, a receiver that is moveable within the cumulative area of focus of the cylindrical trough mirror, a secondary mirror integrated with the receiver that augments solar energy collection, and parallel linear tracking assemblies that move the receiver and that mount to a building's side walls.

3 Claims, 11 Drawing Sheets

CONCENTRATING SOLAR ENERGY DEVICE

BACKGROUND OF THE INVENTION

This invention relates to concentrating solar energy devices, particularly those that are integrated with buildings. These devices can be thermal or electrical in principle, and they provide energy for buildings or to the electrical grid. It is advantageous that these systems are efficient and integrate readily into buildings for cost savings.

Of the currently deployed concentrating solar energy devices, the majority use relatively large optical elements consisting of parabolic mirrors or Fresnel lenses. These optics yield very high solar concentrations but with correspondingly narrow solar acceptance angles. The latter characteristic requires that the optics and solar energy receiver follow the sun by means of an accurate solar tracker. This considerable moving bulk renders these high concentration devices difficult to integrate into buildings.

In contrast, a concentrating mirror in the shape of an open-ended shallow trough with circular arc profile, commonly referred to as a cylindrical mirror, can remain fixed as part of a building roof yet provide a medium degree of solar concentration. A cylindrical mirror is often classified in the field of the invention as a non-imaging mirror. Other non-imaging mirrors have been taught in the prior art, such as those with anticlastic or dual-parabolic shapes, but their complex curvatures make them difficult to manufacture and integrate into buildings. A cylindrical mirror, however, is readily made by curving flat reflective sheets and fixing them to supports with pre-cut curvatures.

A cylindrical mirror projects an oblong area of focus parallel to its axis of curvature. As the sun traverses a cylindrical mirror that is longitudinally oriented east-west, focus changes in both position and concentration ratio. The compiled area of this dynamic focus is the cylindrical mirror's cumulative area of focus. In order to collect solar energy efficiently, a narrow linear receiver is dynamically positioned by a tracking mechanism within the cumulative area of focus.

Cylindrical mirrors and other non-imaging primary mirrors in concentrating solar energy systems typically have oblong axes of curvature oriented east-west. In this orientation, the receiver, also aligned east-west, tracks across the mirror's width as solar declination varies seasonally. The annual extent of solar declination is approximately 47 degrees at latitudes between 30 and 40 degrees north, where promising solar sites abound. This indicates that the receiver need only move tiny increment from day to day, and its position never exceeds the field of the mirror.

A cylindrical mirror's peak ratio of concentration varies inversely with its arc. For example, an arc of 72° will yield approximately 31× peak concentration, while a shallower arc of 40° will yield approximately 71× peak concentration. Collecting solar energy at higher concentration by using mirrors with shallow arcs is advantageous, as the mirror requires less material for its construction. A cylindrical mirror with shallow arc profile also integrates more readily into a building roof, and a relatively narrower receiver can be utilized.

A cylindrical mirror in east-west orientation is ideally inclined toward the equator at an angle from the horizontal approximately equal to the latitude of the cylindrical mirror's location. At this angle, solar declination during an equinox translates to an incidence normal to the cylindrical mirror's chord. As solstice approaches, solar incidence gradually moves off normal. The limit, at solstice, is approximately 23° off normal for locations at latitudes between 30 and 40 degrees.

As solar incidence moves off normal, concentration ratio of a cylindrical mirror decreases. For example, when solar incidence is normal to the chord of a cylindrical mirror of 40° arc, concentration ratio is 71×. When solar incidence is 20° off normal, however, concentration ratio is reduced to 48×. As such, a solar energy receiver just wide enough to encompass a cylindrical mirror's focus at normal incidence would be too narrow to capture the wider focus at 20° off normal.

A cylindrical mirror's variation in concentration therefore requires careful selection and optimization of a solar receiver. Highly efficient evacuated solar tube collectors are now standard components in parabolic trough concentrating devices. These devices are in widespread use for utility-scale concentrating solar power systems. Evacuated solar tube collectors are most commonly available as a 70 mm diameter absorber tube surrounded by a 120 mm evacuated clear glass tube.

The high efficiency that makes these solar tube collectors attractive for use in parabolic concentrators also benefits cylindrical mirror concentrating devices. However, when solar incidence is off normal with respect to a building-integrated cylindrical mirror of practical size, focal width will exceed the 70 mm aperture of standard collector tubes. This off-normal focal width could be captured with a double row of collector tubes but at a penalty of double expense and weight. A lower-cost solution is use of additional optics to augment solar energy collection of a single-row of collector tubes.

Another design challenge for systems with non-imaging concentrating mirrors is finding the optimum path for a receiver to track the mirror's dynamic focus. Two principal tracking methods have been employed in prior art, by mounting the receiver on pivoting arms that direct it in an arc path, or by mounting the receiver to a linear tracking device that drives the receiver along a linear path.

When these paths were carefully optimized by the inventor, specifically for a cylindrical mirror with 40° arc, differences in annual energy yield was inconsequential. However, a pivoted tracker places the entire receiver weight and torsional load onto relatively small mounting areas, while a linear tracker distributes these loads across a relatively broader area. This is a concern when the mounting areas are wood or concrete block walls, since these materials are prone to fracturing under repetitive stress.

In prior art, roof-mounting of a tracking mechanism creates several problems, namely, increased roof load, increased solar shading of the primary mirror, difficult access for maintenance and monitoring, and additional roof penetrations. Mounting of a tracking mechanism on a building's sidewalls obviates these issues.

A sidewall-mounted tracking mechanism, however, necessitates a receiver long enough to span clear of the building roof. The receiver's additional thermal expansion and elasticity must be dealt with in order to reduce stress on structural components. This issue has not been adequately addressed in prior art but can be solved with appropriate structural design.

SUMMARY OF THE INVENTION

Accordingly, it is an advantage of the present invention that concentrated solar energy heats a thermal fluid to efficiently provide energy for a building.

It is another advantage of the present invention that its primary optical component, a cylindrical mirror, is not required to track the sun, thereby reducing moving bulk of the device.

It is another advantage of the present invention that its cylindrical mirror can be fixed as part of a building roof.

It is another advantage of the present invention that it's solar energy receiver incorporates highly efficient, commercially available evacuated solar tube collectors.

It is another advantage of the present invention that a secondary mirror augments solar energy collection of the receiver while providing it with weather protection.

It is another advantage of the present invention that its receiver is impelled by a linear tracking mechanism.

It is another advantage of the present invention that its tracking mechanism can be located at the sides of a building.

It is another advantage of the present invention, that although its receiver spans clear of the building roof, the receiver is structurally supported at intervals along its length.

It is another advantage of the present invention that its linear tracking mechanism supports the weight of the receiver across a broad mounting area, thereby minimizing stress fracturing.

It is another advantage of the present invention that it includes means for reducing structural stresses induced by thermal expansion of the receiver.

It is another advantage of the present invention that it shares supporting members with a building structure for cost savings.

The above and other advantages disclosed herein are carried out by the present invention, which is a concentrating solar energy device that can be structurally integrated with a building. In the preferred embodiment, a cylindrical trough mirror, integrated as part of a building roof, concentrates sunlight onto a solar energy receiver that is impelled by a linear tracking mechanism.

The receiver in the preferred embodiment is of the thermal type, although a photovoltaic type or combined photovoltaic and thermal type could be employed. The receiver is oriented east-west and is positioned by the tracking mechanism optimally within the cylindrical mirror's focus. The receiver is supported at each end by upright conduits that allow thermal fluid to circulate between the receiver and the building in which the invention is installed. These upright conduits are fastened to carriages of the linear tracking mechanism that run on linear bearings fastened to the building side walls. Carriage position is adjusted by twin screws driven by synchronous stepper motors. With this arrangement, the receiver tracks focus of the cylindrical mirror.

The receiver incorporates commercially available evacuated solar thermal tubes in a single row series. A secondary mirror array is deployed above this series in order to augment solar energy collection and to protect it from inclement weather.

In its preferred embodiment, the invention is structurally integrated into a building. During operation, a cylindrical mirror focuses concentrated solar energy onto a moveable receiver that transfers collected heat to a fluid within the receiver. The heated fluid is circulated between the receiver and the building's heating and cooling equipment to provide renewable space heating, air conditioning, and water heating.

DETAILED DESCRIPTION OF THE INVENTION

Figure 1:
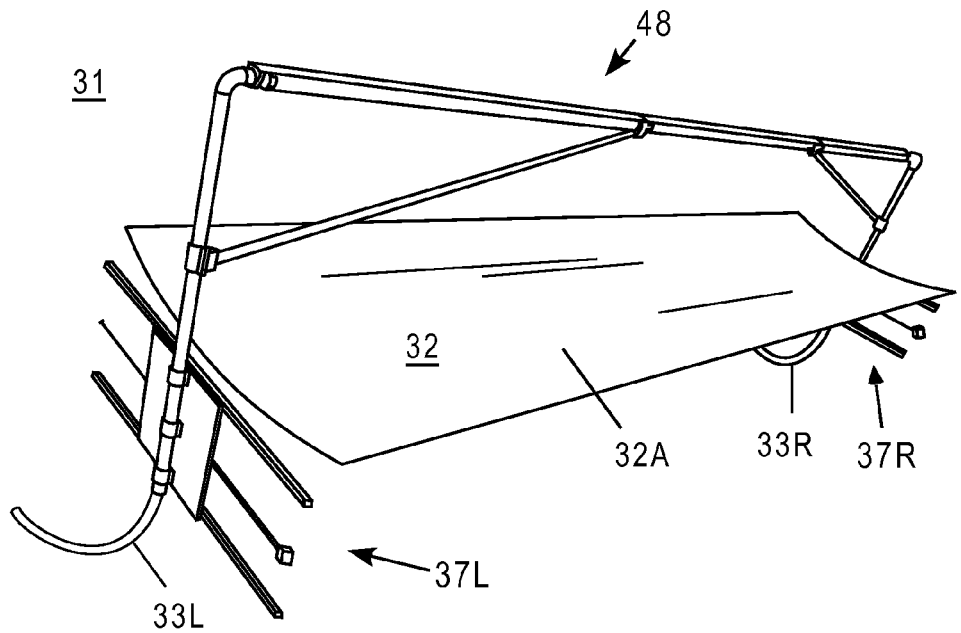
FIG. 1 is a perspective view of a concentrating solar energy device.

FIG. 1 shows a concentrating solar energy device 31 that can be structurally integrated into a building to provide it with energy. Linear tracking assemblies 37L and 37R are symmetrically identical and position receiver 48 optimally within the concentrated focus of cylindrical mirror 32.

A cylindrical mirror is herein defined as a type of non-imaging mirror in the shape of an open-ended trough that is curved laterally in a circular arc and having a reflective concave field. Advantageous to the invention is that cylindrical mirror 32, which comprises the primary optical element in the device, need not track the sun in-order to capture and concentrate solar energy consistently. Cylindrical mirror 32, accordingly, remains fixed, which simplifies structural integration of the invention into buildings.

Cylindrical mirror 32 has a reflective surface 32A applied to its concave field, which is disposed skyward. Cylindrical mirror 32 is made from sheet metal conformed to cylindrical curvature. Reflective surface 32A is comprised of commercially available adhesive-backed solar mirror film.

Figure 2:
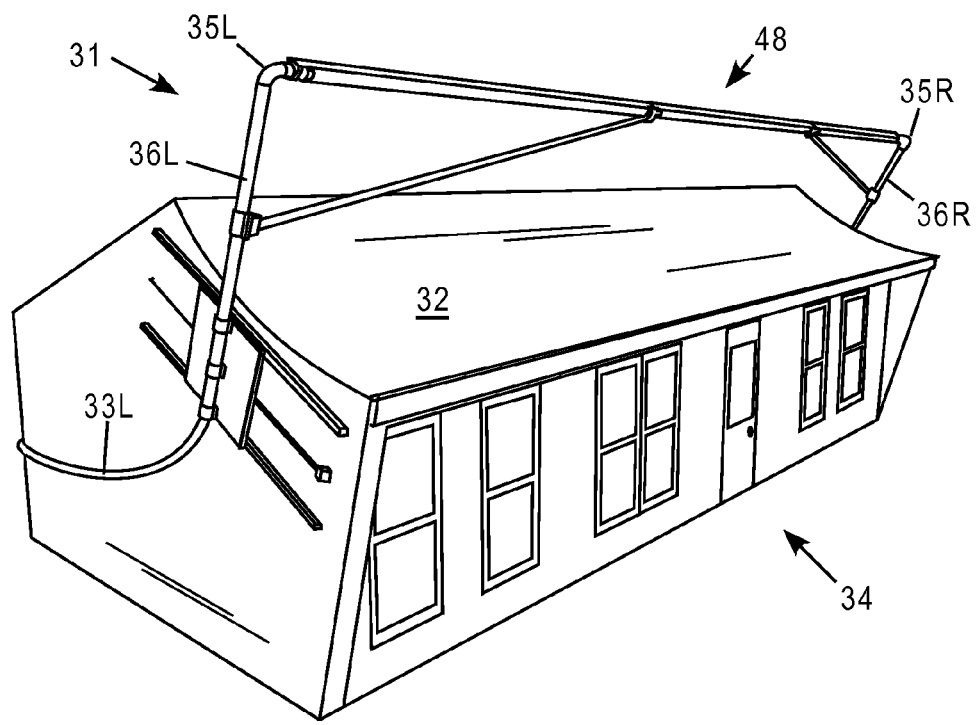
FIG. 2 is a perspective view of a concentrating solar energy device integrated into a building.

In FIG. 2, concentrating solar energy device 31 is shown integrated into building 34. Fixed cylindrical mirror 32 focuses solar energy onto receiver 48, heating a thermal fluid circulated within receiver 48. This fluid is communicated communally within pipe elbows 35L and 35R, supporting pipes 36L and 36R, and hoses 33L and 33R, which in turn are connected to commercially available heating, cooling, and hot water systems, not shown, for building 34. Such systems typically utilize fluid pumps, heat pump processes, heat exchangers, and thermal storage. When operatively connected to such systems, device 31 supplies them with thermal energy to drive space heating, process heating, air conditioning, and water heating.

Figure 3:
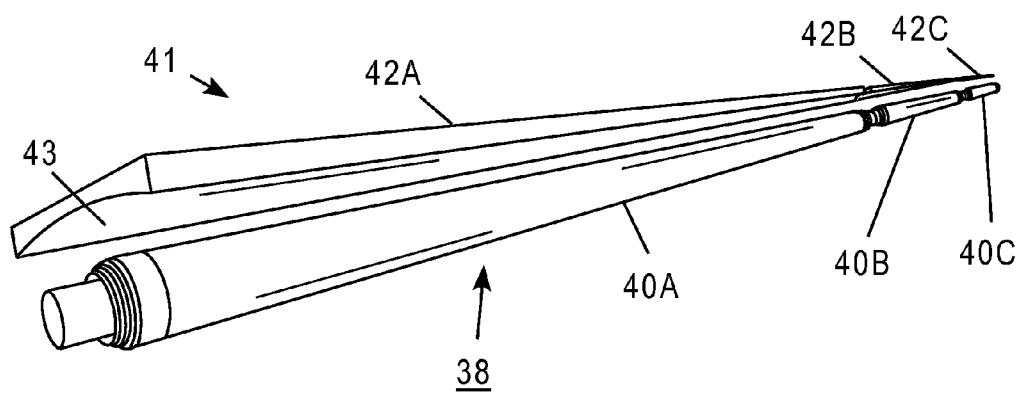
FIG. 3 is a perspective view of a solar thermal tube array and a secondary mirror.

The invention's receiver components and assembly are now disclosed. FIG. 3 shows a collector array 38, comprised of three identical, commercially available evacuated solar thermal tube collectors 40A, 40B, and 40C joined end-to-end in a linear series, permitting mutual communication of thermal fluid. Secondary mirror array 41 is comprised of identical secondary mirrors 42A, 42B, and 42C, corresponding in number and length to collectors 40A, 40B, and 40C and correspondingly attached to and above collectors 40A, 40B, and 40C in optical opposition. Secondary mirror array 41 performs two functions relating to collector array 38, namely, augmentation of solar energy collection and weather protection.

Secondary mirror 42A is an oblong, shallow trough mirror made by metal extrusion, roll-forming, or by other means by those knowledgeable in the art of metal fabrication. Reflective surface 43, comprised of commercially available adhesive-backed solar mirror film, is applied to the lower-disposed concave field of secondary mirror 42A. Secondary mirrors 42B and 42C are identical to secondary mirror 42A.

Figure 4:
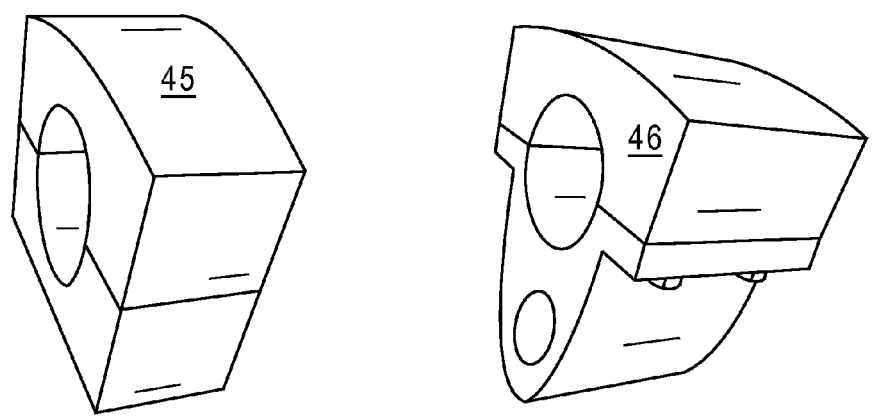
FIG. 4 is a perspective view of mounting parts for a secondary mirror.

FIG. 4 shows parts used to connect secondary mirrors 42A, 42B and 42C (FIG. 3) to collector array 38. In FIG. 4, connector 45 is an end connector, and connector 46 is an intermediate connector. Each has a cylindrically curved, radially oriented convex top surface which matches the concave cylindrical curvature of the lower fields of secondary mirrors 42A, 42B and 42C (FIG. 3). In FIG. 4, connectors 45 and 46 each has a cylindrical void that corresponds respectively with the circumference of the ends of tube collectors 40A, 40B, and 40C (FIG. 3).

Figure 5:
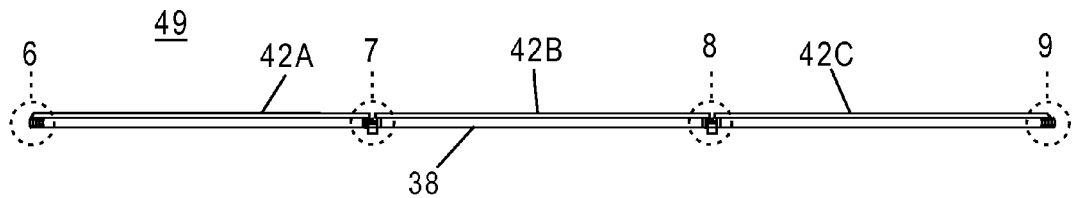
FIG. 5 shows an assembled solar thermal receiver.

FIG. 5 shows an assembled receiver 49 wherein secondary mirrors 42A, 42B and 42C are attached in a series at four equidistant attachment points above collector array 38.

Figure 6:
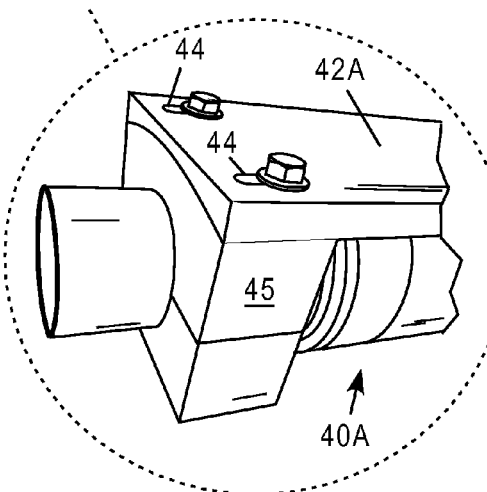
FIG. 6 is a detail perspective view of a left end attachment for a secondary mirror.

In FIG. 6, a detail perspective view, a connector 45 attaches around the circumference of the left exposed end of absorber tube 40A. Connector 45 also attaches perpendicular to and flush under the left end of the lower field of secondary mirror 42A.

Secondary mirror 42A has longitudinally oriented parallel mounting slots 44 cut through its thickness at one end of its length. Bolts are inserted through slots 44 and driven into connector 45 such that they are loosely seated onto secondary mirror 42A. This allows one end of secondary mirror 44 to slide with respect to the collector 40A, thereby decoupling longitudinal thermal expansion of tube collector 41A from secondary mirror 12A during solar exposure.

Figure 7:
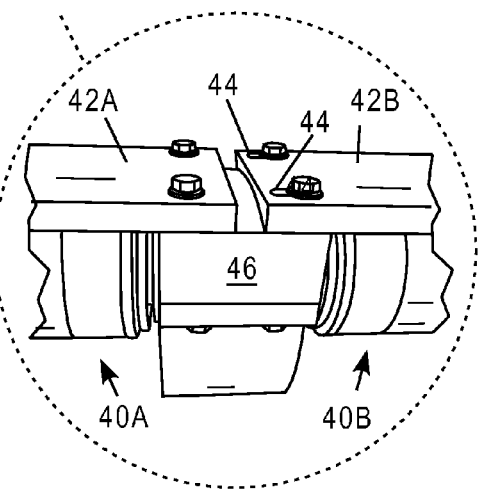
FIG. 7 is a detail perspective view of intermediate attachments of secondary mirrors.
Figure 9:
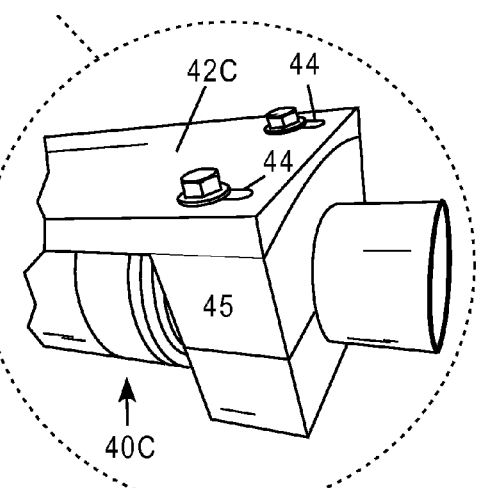
FIG. 9 is a detail perspective view of a right end attachment for a secondary mirror.

FIG. 7 and FIG. 9 show, respectively, similar slidable attachment utilizing slots 44 of secondary mirrors 42B and 42C. In FIG. 7, a detail perspective view, a connector 46 is fixed concentrically around the circumference of the junction of tube collectors 40A and 40B. Connector 46 also joins the adjacent ends of secondary mirrors 42A and 42B by attaching perpendicular to and flush under the lower fields of secondary mirrors 42A and 42B. Secondary mirror 42A is bolted tightly to connector 46.

Figure 8:
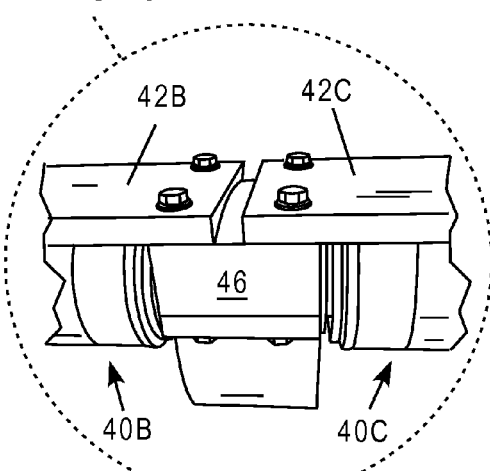
FIG. 8 is a detail perspective view of intermediate fixed attachments of secondary mirrors.

In FIG. 8, a detail perspective view, a connector 46 is fixed concentrically around the circumference of the junction of tube collectors 40B and 40C. Connector 46 also joins the adjacent ends of secondary mirrors 42B and 42C by attaching perpendicular to and flush under the lower fields of secondary mirrors 42A and 42B. Secondary mirrors 42B and 42C are bolted tightly to connector 46.

In FIG. 9, a detail perspective view, a connector 45 attaches around the circumference of the right exposed end of absorber tube 40C. Connector 45 also attaches perpendicular to and flush under the right end of the lower field of secondary mirror 42C.

We will now disclose optical geometry of the invention. When a cylindrical mirror's axis of curvature is oriented east-west, the sun's right ascension angle, which corresponds to earth's daily rotation cycle, has no effect on concentration. The sun's declination angle, however, is directly related to cylindrical mirror concentration. Declination angle corresponds to earth's annual cycle around the sun.

Figure 10:
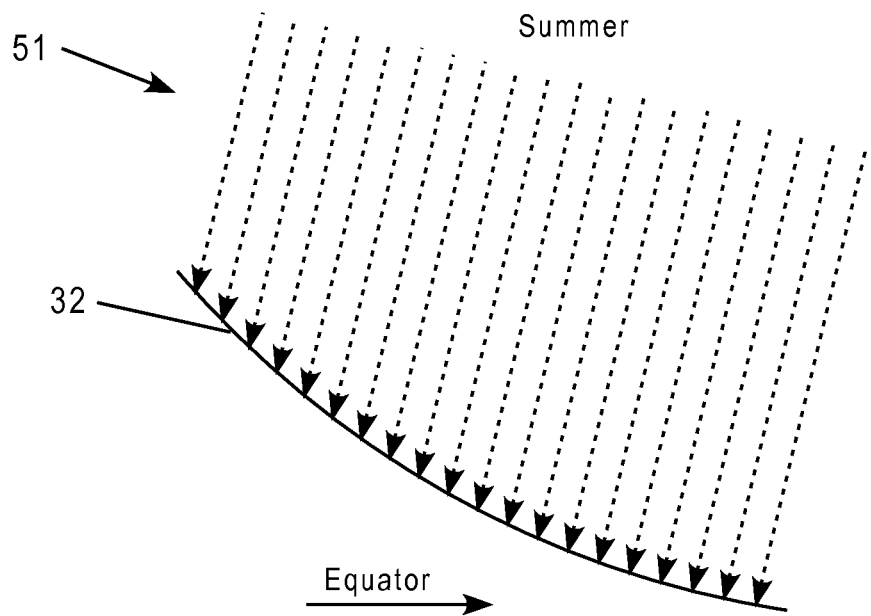
FIG. 10 is a profile view of a cylindrical mirror and a set of impinging solar rays at equinox.
Figure 11:
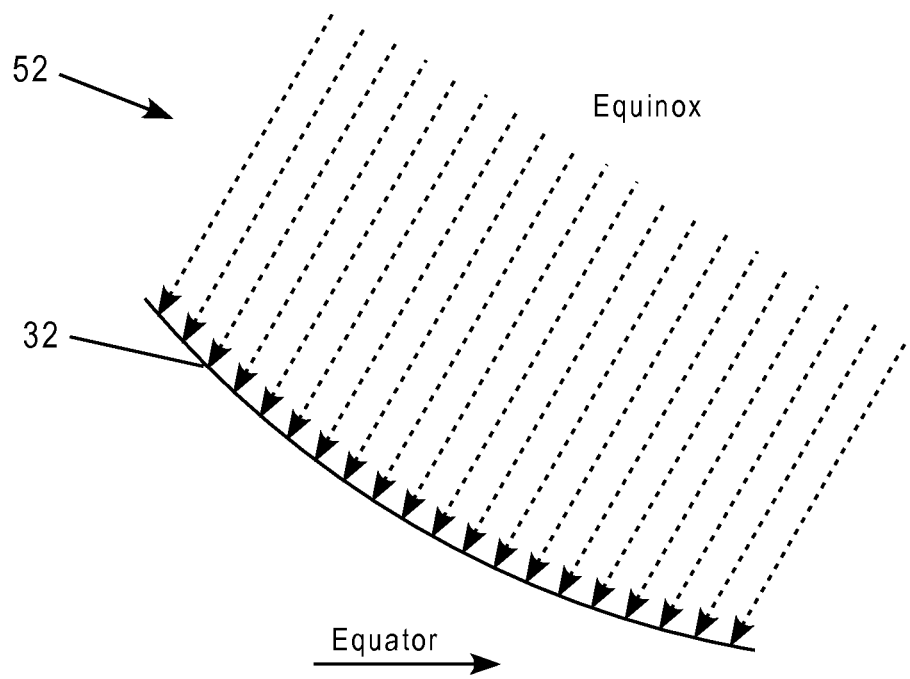
FIG. 11 is a profile view of a cylindrical mirror and a set of impinging solar rays in summer.
Figure 12:
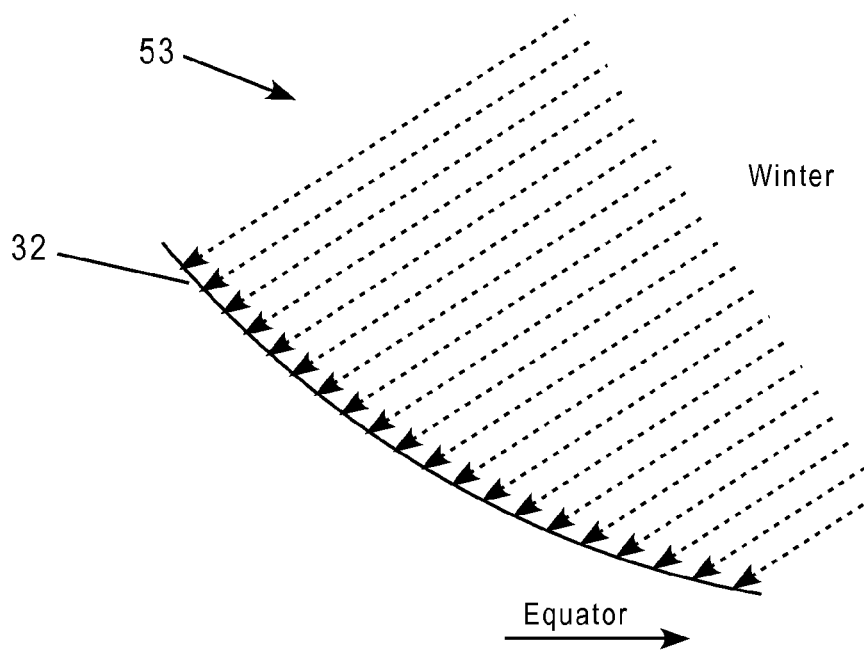
FIG. 12 is a profile view of a cylindrical mirror and a set of impinging solar rays in winter.

In FIG. 10, cylindrical mirror 32 is tilted from horizontal toward the equator at an angle from the horizontal equivalent to installation latitude. Incident solar rays 51 impinge on cylindrical mirror 32 during a summer day. In FIG. 11, incident solar rays 52 impinge on cylindrical mirror 32 during a solar equinox, which occurs in spring or fall. In FIG. 12, incident solar rays 53 impinge on cylindrical mirror 32 during a winter day.

Figure 13:
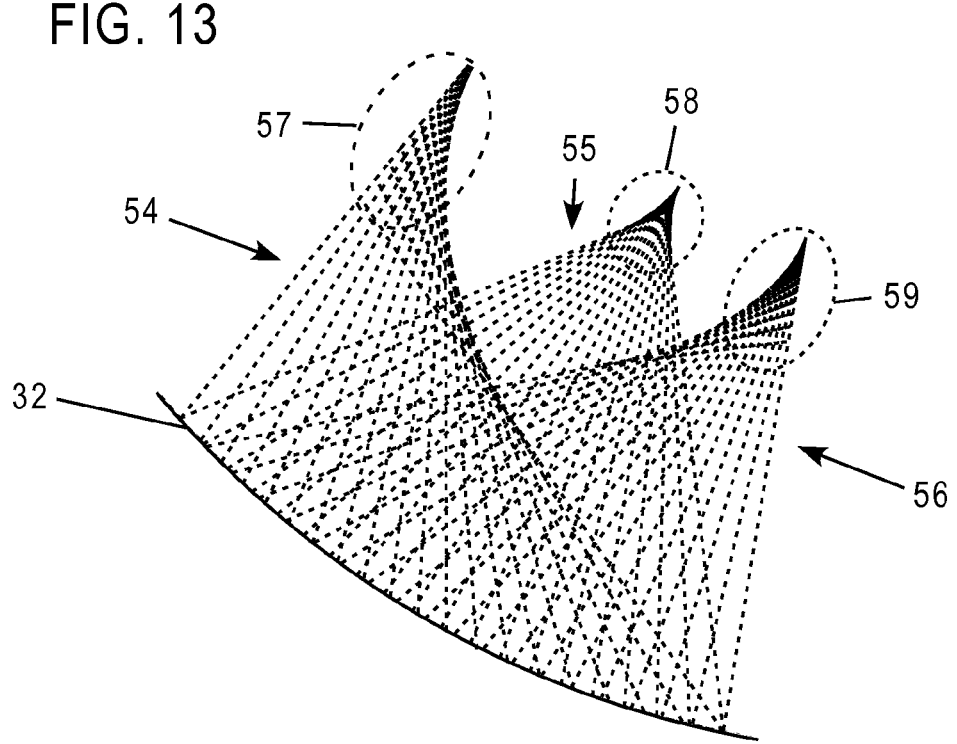
FIG. 13 is a profile view of a cylindrical mirror and three sets of resultant solar rays.

Referring to FIG. 13, resultant rays 54, 55, and 56 were ray-traced from corresponding incident rays 53 (FIG. 10), 52 (FIG. 11), and 51 (FIG. 12). In FIG. 13, a comparison of foci 57, 58, and 59 demonstrates that cylindrical mirror 32 maintains focus in different seasons despite its fixed position. Foci 57 and 59 are larger in area than focus 58, however, and to maximize capture of focused solar energy in these larger areas, an optical augmentation means will be demonstrated.

Figure 14:
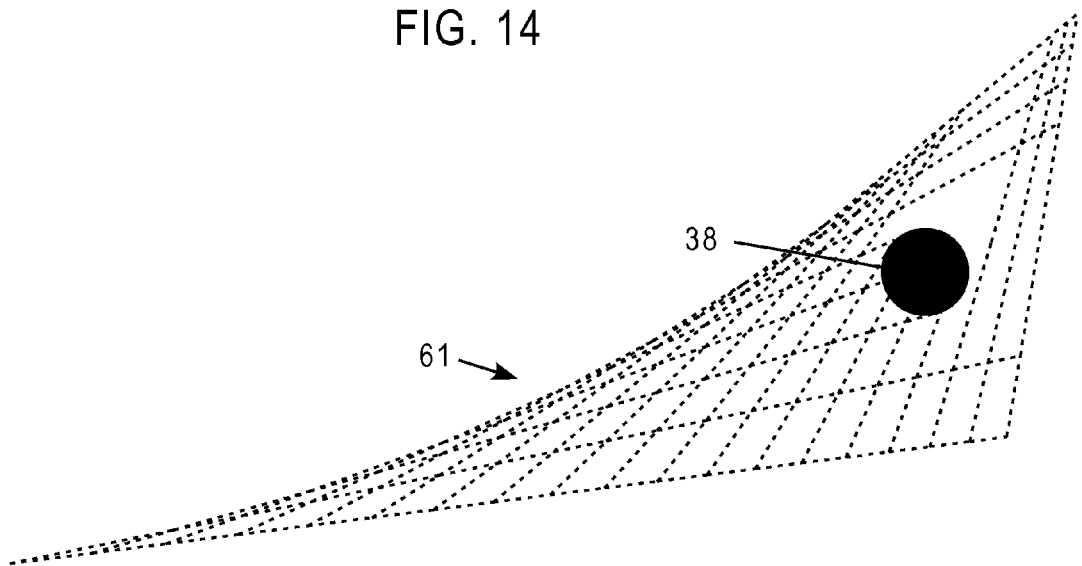
FIG. 14 is a profile view of a cylindrical mirror, a set of resultant solar rays, and a receiver.

FIG. 14 shows focus 61 during a mid-summer day. Focus 61 represents the average size focus produced by the invention's cylindrical mirror. It is readily apparent that focus 61 exceeds the diameter of collector array 38, shown in profile within focus 61. Approximately two-thirds of the rays in focus 61 miss collector array 38 and are not collected as solar energy.

Figure 15:
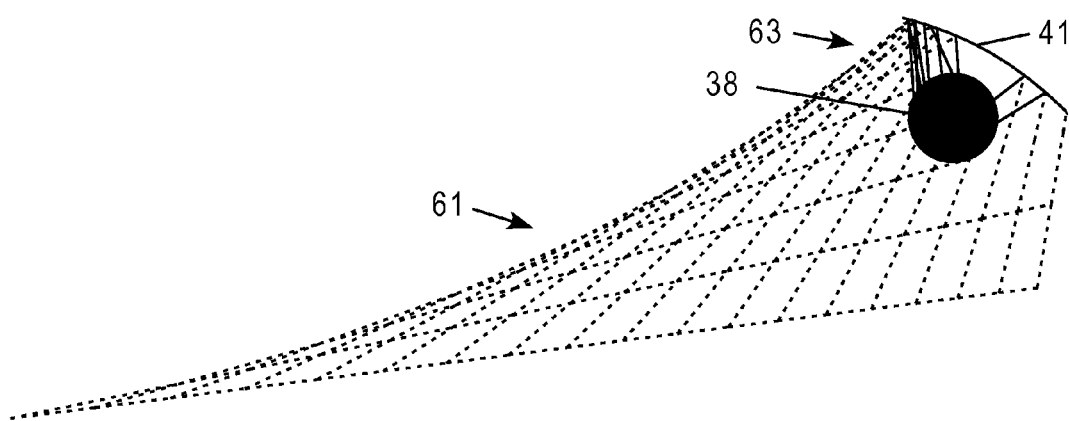
FIG. 15 is a profile view of impinging rays on a secondary mirror and reflected rays striking a solar thermal tube array.

FIG. 15 demonstrates solar energy augmentation by secondary mirror array 41, whereby most said misses are redirected onto collector array 38 as reflected rays 63, depicted with solid lines.

Figure 16:
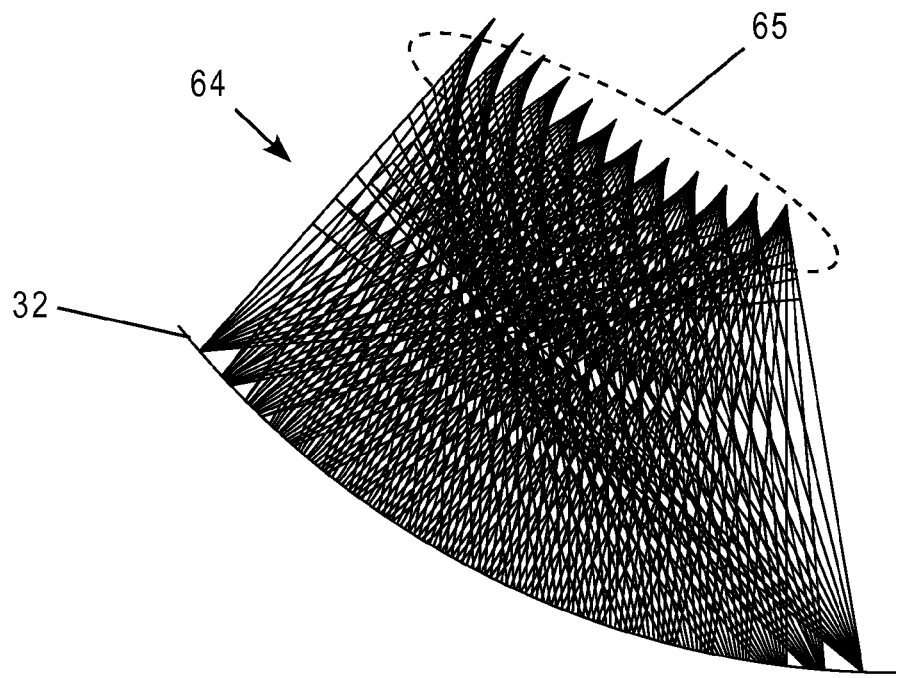
FIG. 16 is a profile view of a cylindrical mirror and its cumulative area of focus.

In FIG. 16, a one year time-lapse depiction of resultant ray traces 64 from cylindrical mirror 32 suggests a cumulative area of focus 65 within which a receiver should travel for optimum solar energy collection.

Figure 17:
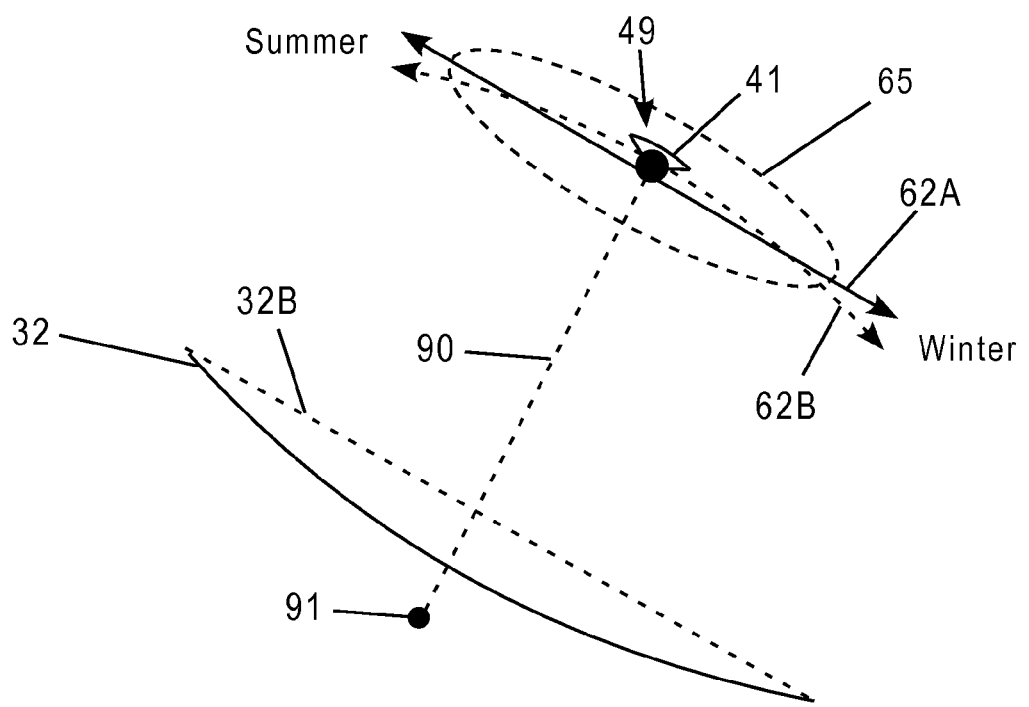
FIG. 17 is a profile view of a cylindrical mirror, its cumulative area of focus, a solar receiver, and possible tracking paths.

FIG. 17 shows receiver 49, disposed within cumulative area of focus 65 such that secondary mirror 41, at mid travel between summer and winter seasons, is in parallel opposition to cylindrical mirror 32. We will consider two paths of travel for receiver 49 within cumulative area of focus 65. A linear path 62A, parallel to cylindrical mirror chord 32B, would result from use of a linear tracking mechanism. A circular path, depicted by dotted line 62B, would result from use of a pivoted tracking mechanism. A pivoted tracking geometry is conceptualized by elongated receiver support 90 and its stationary pivot 91, which together would constrain receiver 49 around circular path 62B.

An advanced ray-tracing analysis comparing a series of linear receiver paths to a series of circular receiver paths was performed by the inventor. Path distance from a cylindrical mirror of 40° arc was varied in the two series; radius was also varied in the circular path series. Results of this investigation demonstrated little difference in annual energy collected by a receiver traveling the most promising paths of each series.

However, a pivoted tracking mechanism generating a circular receiver path concentrates the entire weight and torsional load of a receiver onto a relatively small mounting area at the pivot. A linear tracking mechanism, on the other hand, distributes weight and torsional load of a receiver over a much larger mounting area. A linear tracking mechanism can thereby be mounted more reliably to building members constructed of wood or concrete block in consideration of the well known propensity of these materials to develop stress fractures when subjected to concentrated loads.

Figure 18:
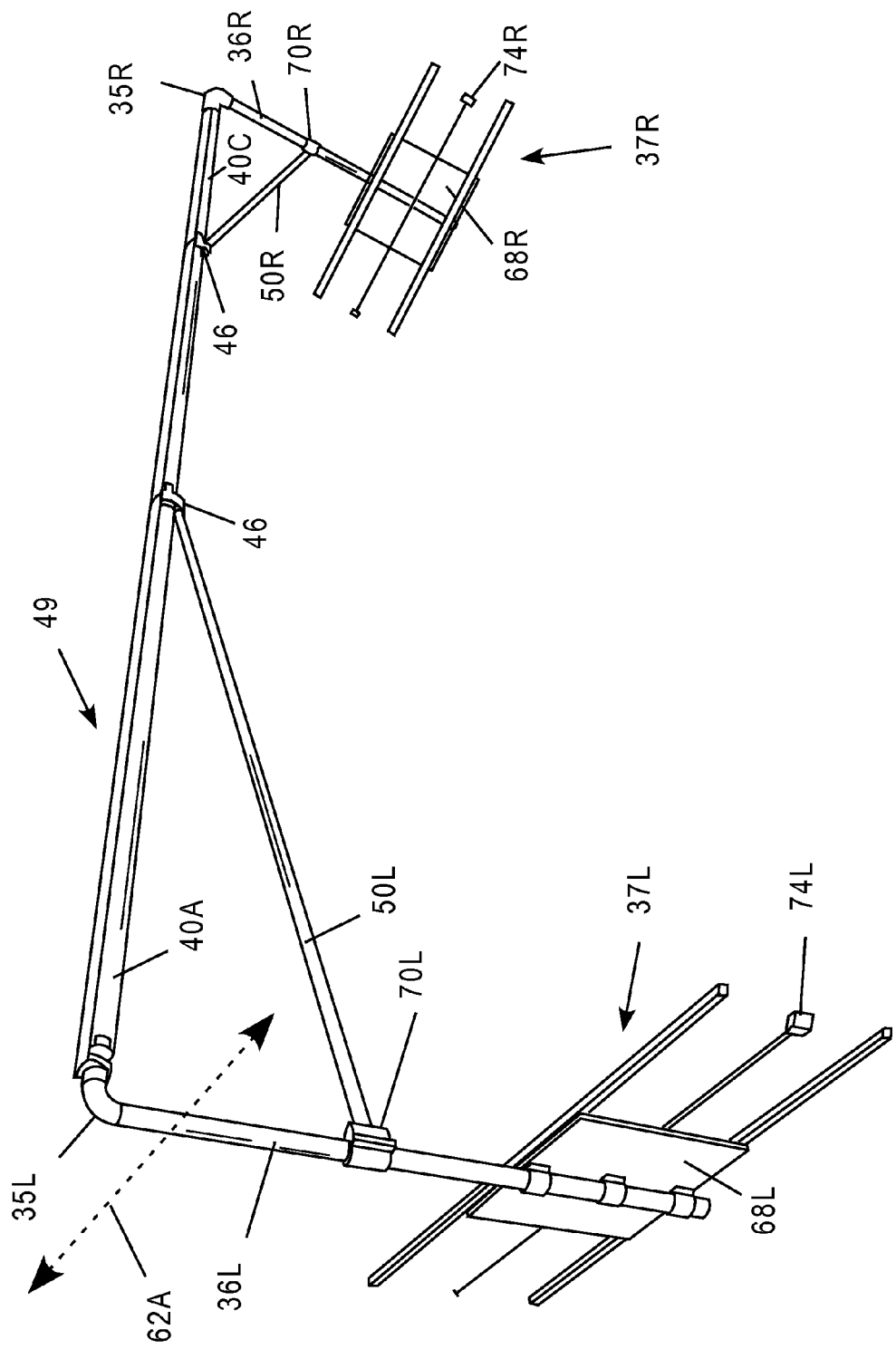
FIG. 18 is a perspective view of a tracking mechanism, a receiver, and supporting members for the receiver.

We now disclose the invention's linear tracking mechanism. Turning to FIG. 18, receiver 49 is supported by and fixed at each end to, via pipe elbows 35L and 35R, the tops of pipes 36L and 36R. Pipes 36L and 36R are opposed parallel to one another in a plane perpendicular to linear path 62A. The lower thirds of the lengths of pipes 36L and 36R are fastened respectively to carriages 68L and 68R. Carriages 68L and 68R are symmetrically opposed and perpendicular to the length of receiver 49. The top edges of carriages 68L and 68R are disposed parallel to linear path 62A.

In order to stabilize receiver 49 from gravity deflection, diagonal supports 50L and 50R are employed. Diagonal support 50L is an elongated member that connects at its higher disposed end to a connector 46 and at its lower disposed end to connector 70L. In symmetrical fashion, diagonal support 50R is an elongated member that connects at its higher disposed end to a connector 46 and at its lower disposed end to connector 70R.

When receiver 49 expands longitudinally during solar exposure, the tops of pipes 36L and 36R are flexed opposite each other. This could stress components joined directly or indirectly to pipes 36L and 36R. As a means of accommodating longitudinal expansion of receiver 49 and reducing said stresses, pipes 36L and 36R are comprised of PTFE, a moderately flexible high-temperature plastic.

In operation of the invention's linear tracking mechanism, stepper motors 74L and 74R are operated synchronously by a commercially-available programmable electronic controller, not shown, to position receiver assembly 49 at precise locations along annual path 62A, for the purpose of optimizing solar energy collection of receiver 49.

Figure 19:
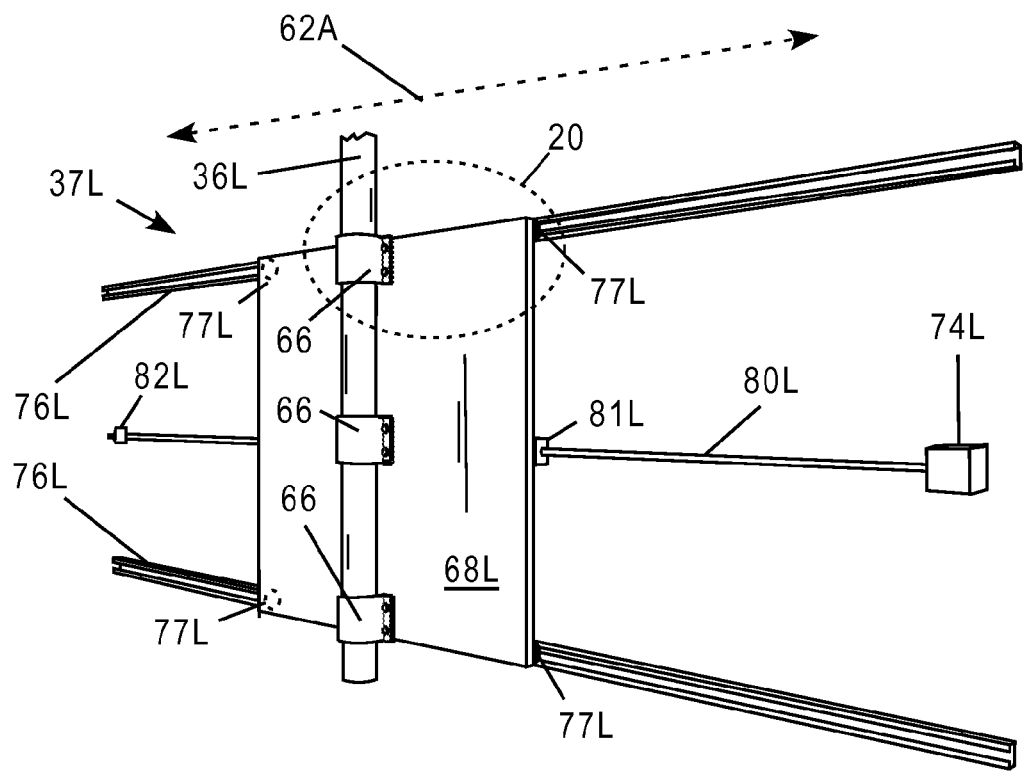
FIG. 19 is a perspective view of the left assembly of a linear tracking mechanism.
Figure 20:
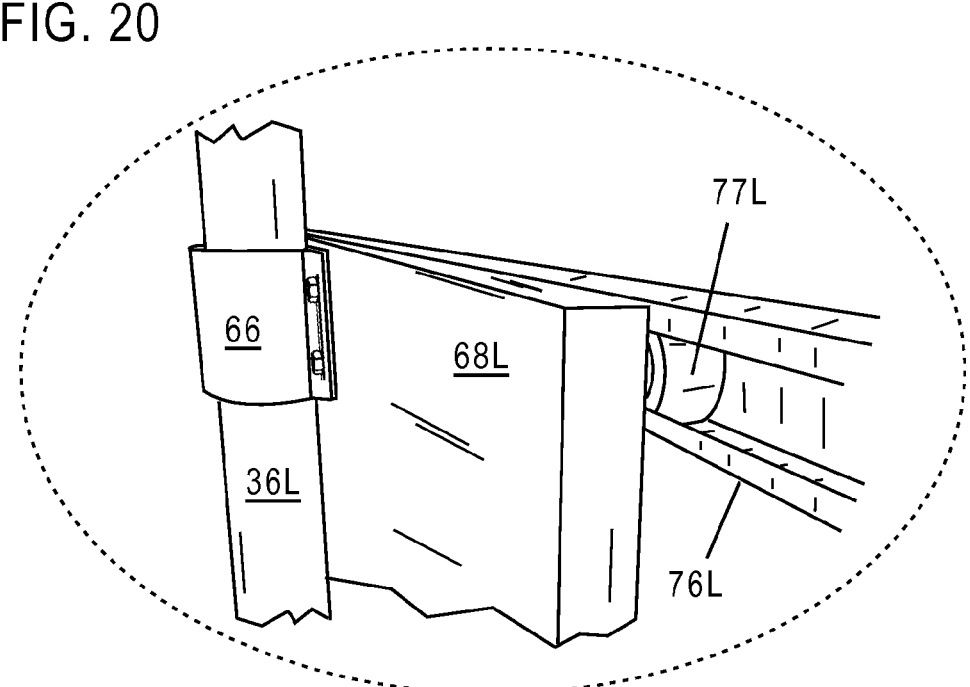
FIG. 20 is a detail perspective view of one corner of a carriage mount.

FIG. 19 shows linear tracking assembly 37L. Carriage 68L is comprised of a flat square plate with its fields disposed vertically and with top edges disposed parallel to linear path 62A. Pipe 36L is mounted to the outer field of carriage 68, bisecting it. Brackets 66 are fixed concentrically around pipe 36L at intervals along its lower length and are bolted to the outer field of carriage 68L. Linear bearings 76L run parallel in a vertical plane and are parallel to linear path 62A. Carriage 68L is attached to rollers 77L that are partially enclosed by and roll within linear bearings 76L as shown in detail in FIG. 20.

In FIG. 19, linear bearings 76L, stepper motor 74L, and bearing 82L must be fixed to a common mounting surface, such as a building's sidewall, for tracking assembly 37L to operate. In operation, carriage 68L can slide on linear bearings 76L along linear path 62A. Carriage 68L has an attached ball nut 81L that is engaged with acme screw 80L. Bearing 82L stabilizes the free end of acme screw 80L. When stepper motor 74L rotates acme screw 80L, screw action impels carriage 68L along annual path 62A.

Figure 21:
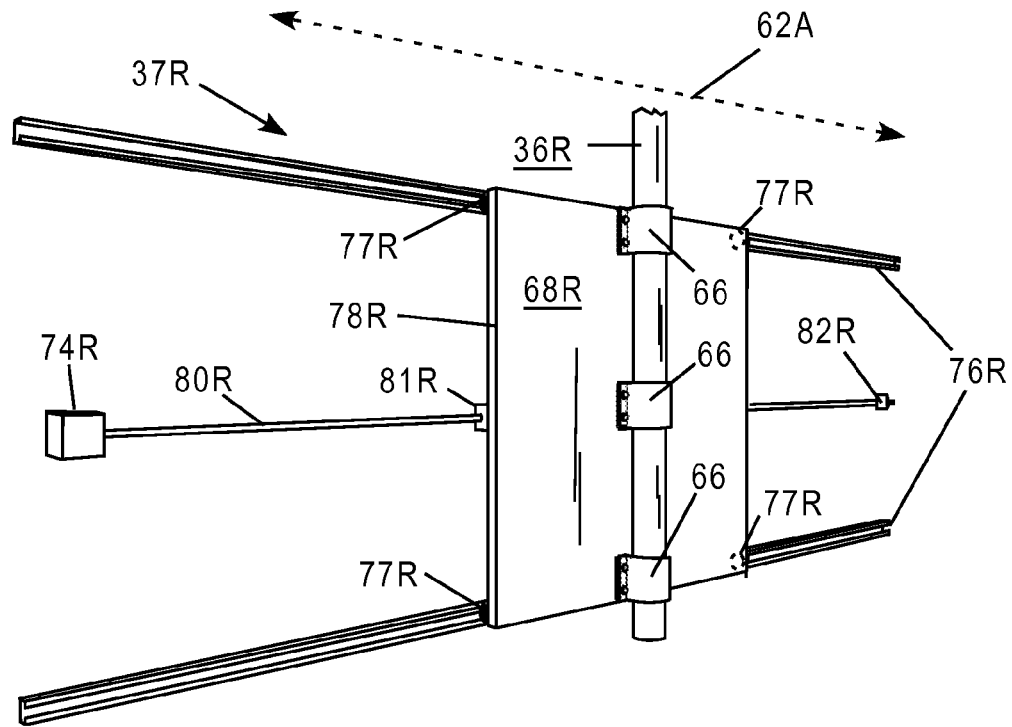
FIG. 21 is a perspective view of the right assembly of a linear tracking mechanism.

FIG. 21 shows linear tracking assembly 37R. The construction and operation of tracking assembly 37R is symmetrically identical to tracking assembly 37L with one exception: acme screws 80R and 80L (FIG. 19) both have right-hand threads.

Figure 22:
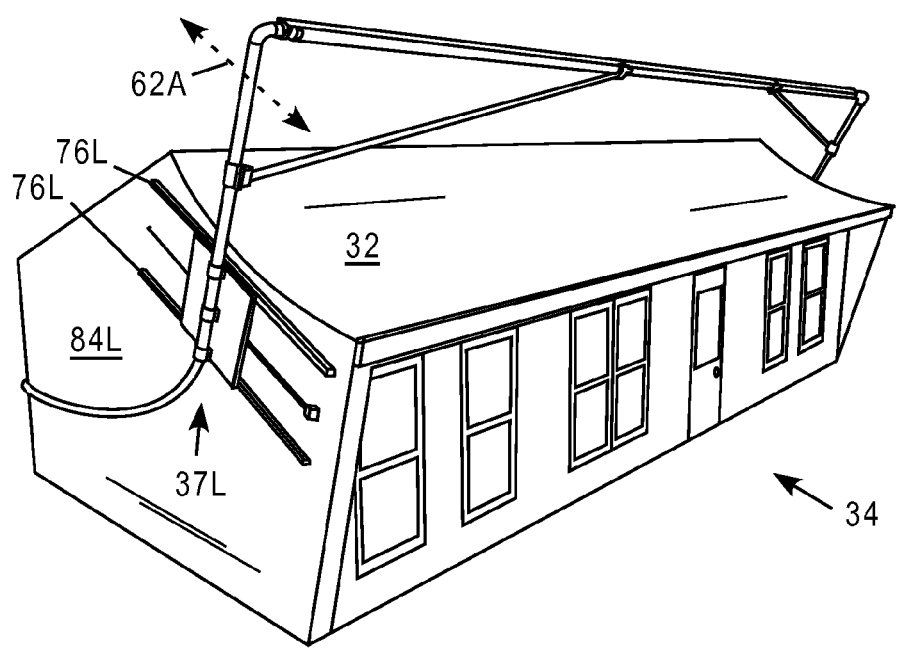
FIG. 22 is a left perspective view of a concentrating solar energy device integrated into a building.

For cost savings, the invention shares structural components with a building. In FIG. 22, cylindrical mirror 32 is integrated into building 34 as a partial roof. Tracking assembly 37L is mounted to building sidewall 84L via linear bearings 76L. Linear bearings 76L are bolted flat against and near the top of the outer disposed field of sidewall 84L, and are longitudinally disposed parallel to linear path 62A.

Figure 23:
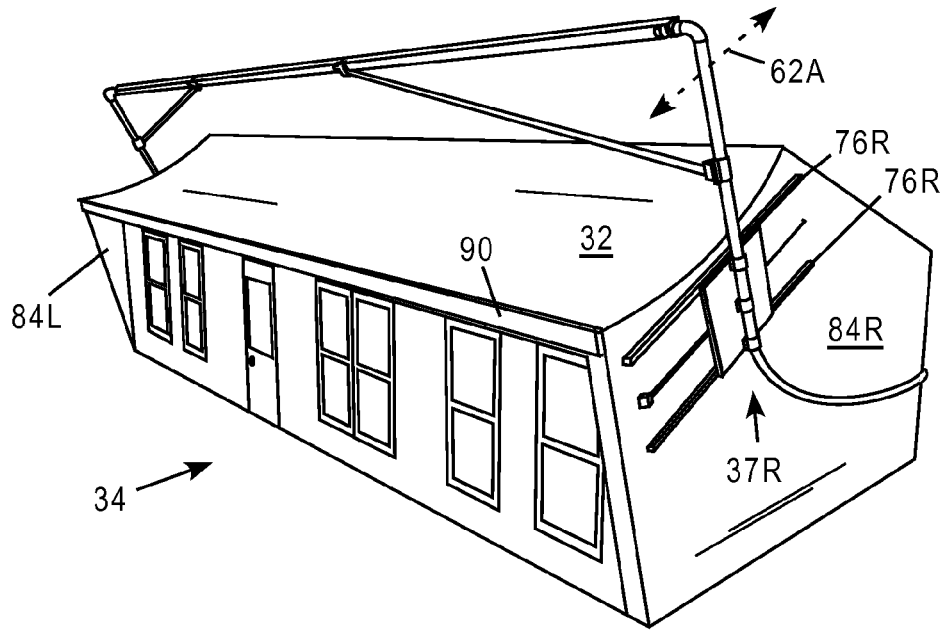
FIG. 23 is a right perspective view of a concentrating solar energy device integrated into a building.

In symmetrical opposed fashion to tracking assembly 37L, FIG. 23 shows tracking assembly 37R supported by building sidewall 84R via linear bearings 76R.

Use of a linear tracking mechanism rather than a pivoted tracking mechanism is advantageous when the invention is integrated into a building. A linear tracking mechanism distributes weight and torsional load of a receiver and its supports, via linear bearings, across a relatively wide area of a building's sidewalls. This arrangement minimizes stress fractures developing in the sidewalls, particularly if the sidewalls are constructed of wood or stone. The sidewall mounting location of the invention's tracking mechanism requires no roof penetrations and simplifies access for monitoring and maintenance of tracking components.

Figure 24:
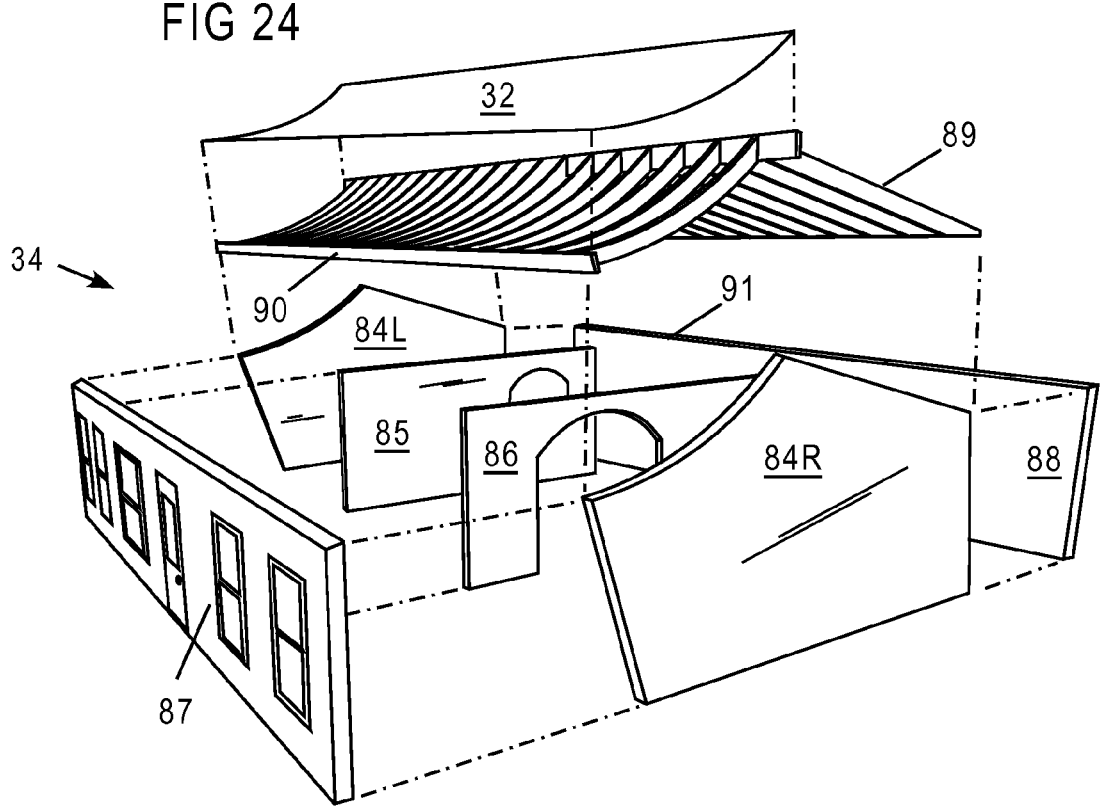
FIG. 24 is an exploded perspective view of structural components of a building designed to support a concentrating solar energy device.

FIG. 24 shows an exploded view of structural components of building 34 and cylindrical mirror 32. Rafters 89 are disposed parallel to sidewalls 84L and 84R and are distributed at intervals under the length of cylindrical mirror 32 to which they add support and hold shape. Rafters 89 are supported from below by front wall 87 and rear wall 88.

The top front surfaces of sidewall 84L, sidewall 84R, and rafters 89 are each pre-cut to equal circular arcs with a common axis parallel to the length of building 34.

Cylindrical mirror 32 is formed from flexible sheet metal conformed to said pre-cut top front surfaces of sidewall 84L, sidewall 84R, and rafters 89. Cylindrical mirror 32 can be attached to said surfaces with hardware fasteners, not shown. Fascia 90, comprising a long board or series of boards, is attached flush to the front of rafters 89, and, as shown in FIG. 23, attached flush to the top of the front surfaces of sidewalls 84L and 84R. The front edge of cylindrical mirror 32 meets the top rear edge of facia 90 and overhangs front wall 87 as an eave, thereby shading front wall 87 in summer for a passive cooling effect.

In FIG. 24, an exploded perspective view, building 34 has interior walls 85 and 86 disposed parallel to sidewalls 84L and 84R and arranged at intervals along the length of building 34. The front surfaces of interior walls 85 and 86 are joined flush and perpendicular to the rear field of front wall 87. The rear surfaces of interior walls 85 and 86 are joined flush and perpendicular to the front field of rear wall 88.

Interior walls 85 and 86, front wall 67, and rear wall 68 can be prefabricated as insulated panels or can be framed on site using construction techniques in common practice. In the preferred embodiment, sidewall 84L, sidewall 84R, and rafters 89 are prefabricated from dimensionally stable wood with curvatures cut by a computer-controlled router.

In an alternate embodiment, the invention is all or partially free-standing and supplies energy for custom needs. Example purposes are process heat, distributed heat, ice making, electric vehicle charging, and utility-scale electricity generation.

Various materials and manufacturing techniques are described above for which a person familiar with the relevant art could easily find alternatives or substitutes. No material or manufacturing technique described herein is intended to eliminate other materials or methods that could be used to achieve functional end results similar to those described.

What is claimed is:
1. A concentrating solar energy device comprising:
 (a) a fixed non-imaging primary mirror in the shape of a trough, forming part of a building roof, and defining a cumulative range of focus above said roof within which solar energy is concentrated,

(b) a plurality of identical solar thermal tube collectors joined communicatively end to end in a linear series, said series disposed parallel above the longitudinal axis of said primary mirror, (c) a plurality of identical secondary trough mirrors, corresponding in number and length to said plurality of said collectors and each correspondingly attached to and above a said collector in optical opposition, (d) slidable attachment of said secondary mirrors to said collectors that decouple linear thermal expansion between said mirrors and said collectors, (e) a linear tracking mechanism attached to said building, and (f) a pair of spaced parallel support pipes disposed substantially vertically, attached near their bottom ends to said linear tracking mechanism and attached at their upper ends to corresponding opposite ends of said series of said collectors.

2. The concentrating solar energy device according to claim 1, said slidable attachment comprising, (a) a plurality of connectors each with a cylindrical void that corresponds in circumference to the ends of said collectors, one each fixed fast around each junction of said series of said collectors, (b) a plurality of bolts fixing fast one end of each said mirror to each proximally located said connector, (c) a plurality of parallel slots cut along the length near the unfixed end of each said secondary trough mirror, and (d) a plurality of bolts, each inserted through the center of each said slot and driven into each proximally located said connector and seated loosely onto each said secondary mirror.

3. The concentrating solar energy device according to claim 1, said linear tracking mechanism comprising:

(a) two double tracks of linear bearings disposed parallel to the chord of said primary mirror and attached to opposite sides of said building, (b) two carriages, running in opposition on said tracks, (c) two ball screw drives, attached to said opposing sides of said building, that impel said carriages, and (d) a pair of stepper motors that synchronously impel said ball screw drives.

* * * * *